Sept. 24, 1940.    L. J. DE LANTY    2,215,605
APPARATUS FOR TESTING METALLIC ARTICLES
Filed Sept. 30, 1939
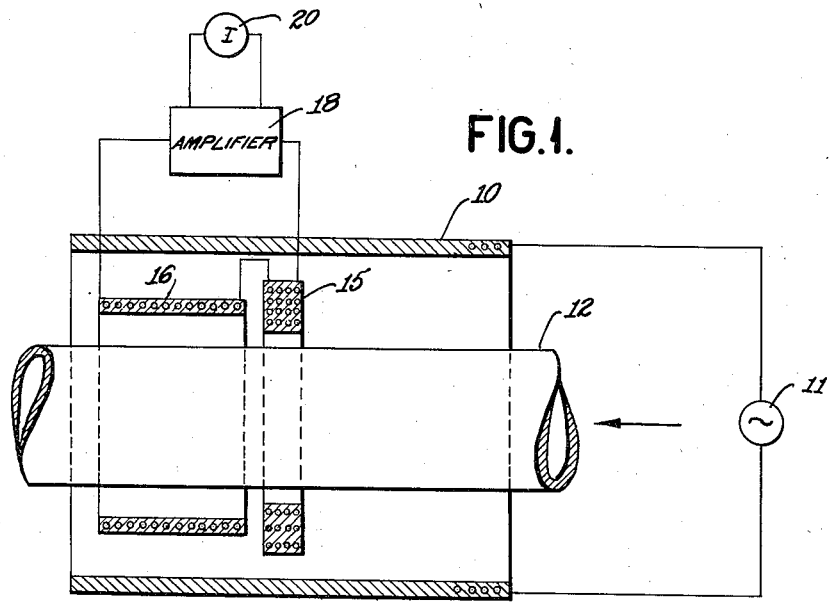
FIG.1.
FIG.2.
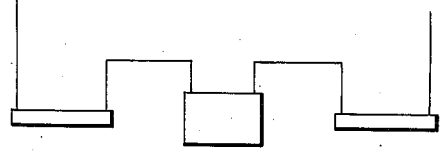
FIG.3.
FIG.4
INVENTOR
LOREN J. DE LANTY
BY
Joseph H. Lipschutz
ATTORNEY Patented Sept. 24, 1940

2,215,605

UNITED STATES PATENT OFFICE 2,215,605

APPARATUS FOR TESTING METALLIC ARTICLES

Loren J. De Lanty, Spring Valley, N. Y., assignor to Sperry Products, Inc., Hoboken, N. J., a corporation of New York Application September 30, 1939, Serial No. 297,203

2 Claims. (Cl. 175—183)

This invention relates generally to the art of electrically testing metallic articles for defects and flaws, and more particularly to a new and improved means for detecting and locating flaws or defects in metallic articles such as tubing, rods, and the like. Heretofore it has been proposed to test such articles by energizing the same with electric current, preferably from an A. C. induction source which is not in physical contact with the article to be tested, and detecting variations in the flow of current in said article by means of an induction coil. In the case of tubes, rods and the like, the testing current was induced circumferentially within the object so that defects such as slits, cracks and the like, would increase the resistance to the flow of such current and cause a variation in the magnetic field in the region of distortion, which variation then affected the induction test coil. Such induced currents in the test coil were then suitably amplified and caused to operate a suitable indicator.

In the above arrangement it was necessary to provide a compensating inductive means connected in opposition to the test coil, having the same inductance as the test coil, and proportioned so that variations in the output of the test coil not due to defects in the article would have no effect upon the indicator. Thus, for instance, a variation in the amount of current induced in the article under test by the inducing current would ordinarily cause a variation of the magnetic field and hence induce E. M. F. in the test coil. If there were no opposed balancing coil, such variation in inducing current would operate the indicator in the same manner as a defect in the article. This is undesirable and is avoided by the use of the opposing compensating coil of equal inductance to the detector coil.

Heretofore the compensating inductance consisted of a pair of coils symmetrically positioned one on each side of the detector coil. Furthermore, the detector coil was concentrated so as to cooperate with a relatively small axial length of tube or the like under test. In this manner it was possible to locate the position of the defect more accurately than if the detector coil were spread out axially along the object. The compensating coils, however, were spread out axially along the object for the reason that if such compensating coil were concentrated axially along the length of the object in the same manner as the detector coil, then if the compensating coil happened to be over a defect at the same time that the detector coil was over a similar defect, no indication would be obtained, because equal and opposite E. M. F.'s would be generated in the two coils. By spreading out the compensating coils axially along an object under test it will be seen that at no time can this coil generate an E. M. F. equal to that generated in the detector coil because of the lesser amount of inductance in the region of a defect due to the spreading of the compensating coil axially.

The arrangement heretofore used, as described above, therefore consisted of a centrally positioned, axially concentrated detector coil, and on either side of said detector coil a compensating coil spread out axially along the length of the object being tested, the inductance of the two compensating coils being equal to that of the concentrated detector coil. It will be understood that the object under test moves relatively with respect to said detector and compensating coils, and it will be seen that in the case of certain defects such as a long slit, part of said defect will be in cooperative relation with the compensating coil while the other part has reached the detector coil. Since the compensating coil is connected in opposition to the detector coil, it will be seen that the impulse generated in the compensating coil by the portion of the defect in cooperation therewith will be subtracted from the impulse generated in the detector coil by the portion of the defect in cooperative relation with the latter coil. In other words, the impulse in the compensating coil nullifies a portion of the impulse in the detector coil. The net result of this construction is therefore a differential impulse into the amplifier of lesser magnitude than would be obtained if the compensating coil were not present.

The principal object of the present invention is therefore to provide means for testing metallic objects, particularly tubes and the like, wherein the maximum impulse generated by the detector coil coming into cooperative relation with the defect is obtained, while at the same time providing the necessary compensation as explained above.

Further objects and advantages of this invention will become apparent in the following detailed description thereof.

In the accompanying drawing,

Fig. 1 shows a side view, partly sectioned vertically, of my invention applied to the detection of defects in tubes.

Fig. 2 is a diagram illustrating the theory of this invention.

Figs. 3 and 4 consist of two portions of oscillograms showing the advantages of the present invention over the form heretofore used.

Referring to Fig. 1 of the drawing, my invention is shown applied to the detection of defects in tubes, although it will be understood that the invention has general application to other electrically conductive objects. The general theory of the invention consists in causing an induction coil 10 energized from any suitable source of alternating current 11 to induce current within the tube 12 under test. The currents are induced in such manner that the induced current flows circumferentially in the tube under test. Positioned close to the tube and preferably surrounding the same, is a detector element 15 such as a coil comprising a plurality of turns, the center of the coil coinciding with the center of the tube. The tube travels in the direction of the arrow and normally an electromagnetic field surrounding the tube as a result of the induced currents therein will cause a given E. M. F. to be generated within coil 15. The said E. M. F. is normally compensated by means of the E. M. F. generated in a compensating coil 16 which has the same inductance as coil 15. The coil 16 may have the same number of turns as coil 15 and be positioned with its center line the same radial distance from the center of the tube under test as the center line of coil 15. The coils 15 and 16 are connected in opposition so that normally the E. M. F.'s which they generate oppose each other and therefore any variations due, for example, to change in induced current caused by variations in the supply 11, or movements of the coils radially with respect to the tube, will not cause any differential E. M. F. to be generated. When, however, a defect is present in the tube under test, then it will be apparent that such defect will come into cooperative relation with coil 15 first and will generate a different E. M. F. from that normally generated and therefore there will be generated a differential E. M. F. in the coils 15, 16. This differential impulse, after being suitably amplified by the amplifier 18, may be caused to operate any suitable indicator 20.

It will be observed that the compensating coil 16 is positioned entirely to one side of detector coil 15 and, further, that said compensating coil is on the leaving side of the detector coil with respect to the direction of travel of the tube. In other words, the positioning of the compensator coil is such that any defect in the tube comes in cooperative relation with detector coil 15 first and after said defect leaves the detector coil it comes in cooperative relation with the compensating coil. The net result of this construction is that the full E. M. F. due to the defect is generated in the detector coil without being simultaneously nullified by that generated in the compensating coil. Heretofore the arrangement employed was as shown diagrammatically in Fig. 2, wherein the defect first cooperated with a portion of the compensating means and then cooperated with the detector coil. If the defect were long enough to cooperate with both coils at the same time, and this was the case whenever slits or other long defects were encountered, then the full differential E. M. F. generated by the detector coil was never obtained, because of the opposing E. M. F. generated by the compensating means in advance of the detector coil. By positioning the compensating means entirely on the leaving side of the detector coil so that the defect initially cooperates solely with the detector coil, the full impulse generated by said coil goes into the amplifier and is effective to operate the indicator.

Figs. 3 and 4 show portions of actual oscillograms made with the Fig. 2 and Fig. 1 arrangements acting upon the same tube defect. By comparing the variations shown in the oscillogram of Fig. 3, which is the amplifier output caused by the Fig. 2 arrangement, with the oscillogram of Fig. 4, which represents the output of the amplifier caused by the Fig. 1 arrangement, it will be seen that a very much larger output is obtained by the Fig. 1 arrangement for the same tube defect.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other equivalent means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In apparatus for the testing of metallic objects, means for electrically energizing the object, detecting means, said object and said detecting means being relatively movable, said detecting means comprising two inductive means of equal inductance and oppositely connected, one inductive means being a detector and the other inductive means being a compensator, said detector cooperating with a relatively short portion and said compensator cooperating with a relatively long portion of said object, said two inductive means being positioned so that each portion of the object cooperates first with said detector and then with said compensator during relative movement of said object and said detecting means.

2. In apparatus for the testing of objects such as tubes, rods and the like, means for causing a varying electrical current to flow in the portion of the object under test in a direction substantially at right angles to the direction of the flaws to be detected, detecting means, said object and said detecting means being relatively movable, said detecting means comprising two induction coils surrounding the object, said coils being of equal inductance and oppositely connected, one induction coil being a detector and the other induction coil being a compensator, said detector coil cooperating with a relatively short portion and said compensator coil cooperating with a relatively long portion of said object, said induction coils being positioned so that each portion of said object under test cooperates first with said detector coil and then with said compensator coil during relative movement of said object and said detecting means.

LOREN J. DE LANTY.